(12) United States Patent
Lin

(10) Patent No.: US 7,660,221 B2
(45) Date of Patent: Feb. 9, 2010

(54) OPTICAL DISK DIFFERENTIATING METHOD AND ELECTRONIC DEVICE THEREOF

(75) Inventor: Ting Yung Lin, Taipei (TW)

(73) Assignee: Pegatron Corporation, Taipei (TW)

( * ) Notice: Subject to any disclaimer, the term of this patent is extended or adjusted under 35 U.S.C. 154(b) by 883 days.

(21) Appl. No.: 11/357,993

(22) Filed: Feb. 22, 2006

(65) Prior Publication Data

US 2006/0193224 A1 Aug. 31, 2006

(30) Foreign Application Priority Data

Feb. 25, 2005 (TW) ............................... 94105864 A

(51) Int. Cl.
*G11B 7/00* (2006.01)
(52) U.S. Cl. ..................... 369/53.22; 369/94
(58) Field of Classification Search ........................ None
See application file for complete search history.

(56) References Cited

U.S. PATENT DOCUMENTS

| | | | | |
|---|---|---|---|---|
| 7,149,169 | B2 * | 12/2006 | Juan et al. ................ | 369/53.22 |
| 2003/0099171 | A1 * | 5/2003 | Ito ........................... | 369/44.32 |
| 2005/0047300 | A1 * | 3/2005 | Ono et al. ................ | 369/53.23 |

* cited by examiner

*Primary Examiner*—Wayne R Young
*Assistant Examiner*—Lixi Chow
(74) *Attorney, Agent, or Firm*—Birch, Stewart, Kolasch & Birch, LLP

(57) ABSTRACT

An optical disk differentiating method applied to an optical disk drive, in which a first level value, a second level value and an optical disk differentiating value generating program are stored and an optical disk is put. The method comprises the steps of: generating a laser beam impinging on the optical disk; generating a first reflex signal when the laser beam is reflected by a surface of the optical disk; generating a second reflex signal when the laser beam is reflected by a reflex layer of the optical disk; calculating a first time frame value when the first reflex signal is greater than or equal to the first level value, and rendering a first beginning time value when the first reflex signal firstly equals the first level value; enabling the optical drive to obtain an optical disk differentiating value according to the first time frame value and the optical disk differentiating value generating program; calculating a second beginning time value as the second reflex signal firstly equals the second level value; calculating a difference between the second beginning time value and the first beginning time value and defining the difference as a response time value; and comparing the response time value with the optical disk differentiating value to determine a type of the optical disk.

22 Claims, 5 Drawing Sheets

OPTICAL DISK DIFFERENTIATING METHOD AND ELECTRONIC DEVICE THEREOF

BACKGROUND OF THE INVENTION

1. Field of Invention

The invention relates to an optical disk differentiating method and an electronic device thereof, and in particular to an optical disk differentiating method with dynamic calculation and an electronic device thereof.

2. Related Art

Digital versatile disks (DVDs) are a new generation of optical information storage medium having a higher data density and a larger capacity than those of the compact disks (CDs), and DVD drives have become the mainstream peripherals in the market. A lot of data are stored in the CDs in the past CD generation, so that the optical disk drive must have the ability of reading the CDs and DVDs in order to satisfy the user's demands. Thus, the problem of compatibility has to be considered when the optical disk drive is designed. That is, the optical disk drive must have the ability of reading various CDs (CD-ROM, CD-R, CD-RW) and DVDs (DVD-ROM, DVD-R, DVD+R, DVD-RW, DVD+RW).

FIGS. 1A and 1B are cross-sectional views showing a conventional CD and a conventional DVD.

The typical DVD 1 includes a dummy substrate 11 with the thickness of 0.6 mm, and a data substrate 12 with the thickness of 0.6 mm. The data substrate 12 is bonded to the dummy substrate 11 to form the DVD 1 having the thickness of 1.2 mm. The data substrate 12 includes a pre-grooved substrate 121, a recording layer 122 formed on a surface of the pre-grooved substrate 121, and a reflective layer 123 formed on the recording layer 122. Then, the dummy substrate 11 and the data substrate 12 are bonded together through a bonding layer 13 to form the DVD 1.

The typical CD 2 has the thickness of 1.2 mm and includes a pre-grooved substrate 211, a recording layer 212 formed on a surface of the pre-grooved substrate 211, a reflective layer 213 formed on the recording layer 212, and a printed layer 214 formed on the reflective layer 213.

The conventional method of differentiating the type of the optical disk is made according to the difference between the thickness of the DVD 1 and the thickness of the CD 2. Typically, the optical pickup head is moved to output a laser beam travelling toward a to-be-tested optical disk, and the laser beam touches the to-be-tested optical disk and is then reflected by the optical disk to generate a reflex signal. The optical disk may be the CD or the DVD, and the laser beam first touches the substrate 121 or 211 of the to-be-tested optical disk and then touches the recording layer 122 or 212 of the to-be-tested optical disk. Because the energies reflected by the substrate 121 or 211 and the recording layer 122 or 212 are different, the optical disk drive calculates the difference between the time when the substrate 121 or 211 generates the reflex signal and the time when the recording layer 122 or 212 generates the reflex signal. Then, the difference is compared with a constant threshold value in order to judge whether the optical disk is the CD or the DVD.

However, the moving speeds of various optical pickup heads manufactured by various factories are different. More particularly, 50% of error is allowed in the specification of the shipped out product. Thus, the possibility of misjudging the type of the optical disk in the optical disk drive is greatly increased when the optical disk drive judges the type of the optical disk according to the time difference of the reflex signal and the constant threshold value.

In the condition that the moving speeds of the optical pickup heads cannot be unified, how to precisely judge the type of the optical disk is an important subject.

SUMMARY OF THE INVENTION

It is therefore the invention is to provide an optical disk differentiating method and an electronic device using this method.

To achieve the above, the invention discloses an optical disk differentiating method applied to an optical disk drive, in which a first level value, a second level value and an optical disk differentiating value generating program are stored, and an optical disk is put. The method includes the steps of: generating a laser beam impinging on the optical disk; generating a first reflex signal when the laser beam is reflected by a surface of the optical disk; generating a second reflex signal when the laser beam is reflected by a reflex layer of the optical disk; calculating a first time frame value when the first reflex signal is greater than or equal to the first level value, and rendering a first beginning time value when the first reflex signal firstly equals the first level value; enabling the optical disk drive to obtain an optical disk differentiating value according to the first time frame value and the optical disk differentiating value generating program; calculating a second beginning time value when the second reflex signal firstly equals the second level value; calculating a difference between the second beginning time value and the first beginning time value and defining the difference as a response time value; and comparing the response time value with the optical disk differentiating value to determine a type of the optical disk.

To achieve the above, the invention discloses an electronic device for reading data of an optical disk or writing data to the optical disk. The electronic device includes a memory unit, an optical pickup head, a signal processing unit, and an optical disk differentiating unit. In this case, the memory unit is for storing a first level value, a second level value, and an optical disk differentiating value generating program. The optical pickup head is for generating a laser beam impinging on the optical disk, and receives a first reflex signal reflected by a surface of the optical disk and a second reflex signal reflected by a reflex layer of the optical disk. The signal processing unit is for calculating a first time frame value when the first reflex signal is greater than or equal to the first level value according to the first level value, and obtains an optical disk differentiating value according to the first time frame value and the optical disk differentiating value generating program. Also, the signal processing unit obtains a first beginning time value when the first reflex signal firstly equals the first level value, and calculates a second beginning time value when the second reflex signal firstly equals the second level value. Also, the signal processing unit calculates a difference between the second beginning time value and the first beginning time value, and defines the difference as a response time value. The optical disk differentiating unit is for differentiating a type of the optical disk according to the response time value and the optical disk differentiating value.

In the optical disk differentiating method and the electronic device thereof according to the invention, the laser beam touches the substrate surface and the recording layer of the optical disk and then the first reflex signal and the second reflex signal are generated. Next, the signal processing unit of the electronic device calculates the first time frame value according to the first level value and the first reflex signal, and then renders the optical disk differentiating value according to the first time frame value and the optical disk differentiating value generating program. The signal processing unit further calculates the second beginning time value of the second reflex signal according to the second reflex signal and the second level value, calculates the difference between the first beginning time value and the second beginning time value, and then obtains the response time value according to the difference. Finally, the optical disk differentiating unit judges the type of the optical disk according to the optical disk differentiating value and the response time value. Compares with the prior art, which judges the type of the optical disk according to the time difference of the constant reflex signal, the type of the optical disk may be correctly judged regardless of the moving speed of the optical pickup head because the first time frame value and the optical disk differentiating value are dynamically generated according to the moving speed of the optical pickup head.

BRIEF DESCRIPTION OF THE DRAWINGS

The invention will become more fully understood from the detailed description given herein below illustration only, and thus is not limitative of the present invention, and wherein:

FIGS. 4A and 4B are schematic illustrations showing measurements of reflex signals according to the preferred embodiment of the invention, wherein FIG. 4A is a schematic illustration showing the measurement of the reflex signal of the CD, and FIG. 4B is a schematic illustration showing the measurement of the reflex signal of the DVD.

DETAILED DESCRIPTION OF THE INVENTION

The present invention will be apparent from the following detailed description, which proceeds with reference to the accompanying drawings, wherein the same references relate to the same elements.

Figure 1A:
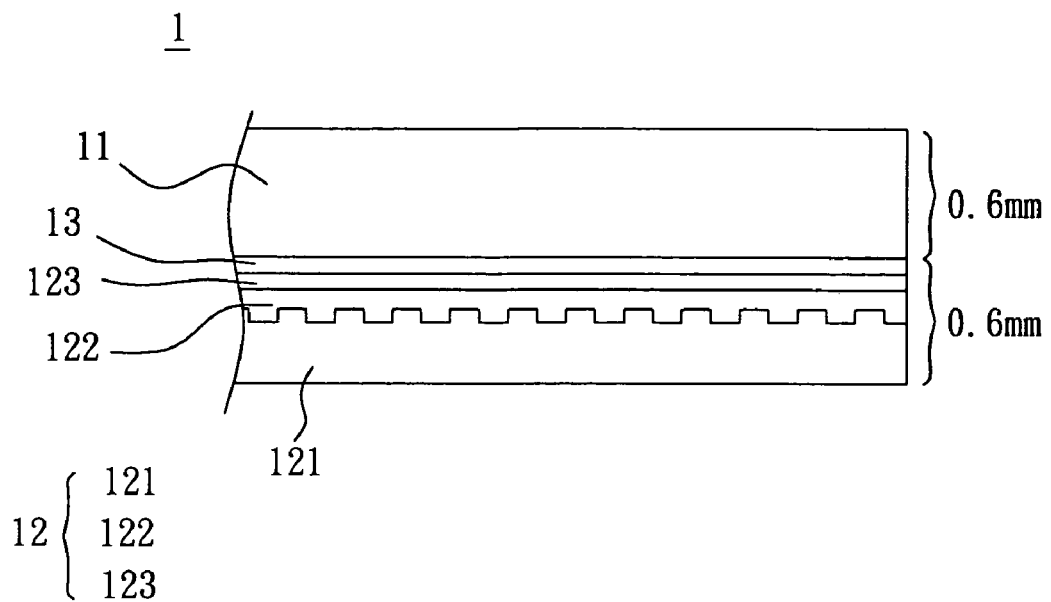
FIGS. 1A and 1B are cross-sectional views showing a conventional CD and a conventional DVD.
Figure 1B:
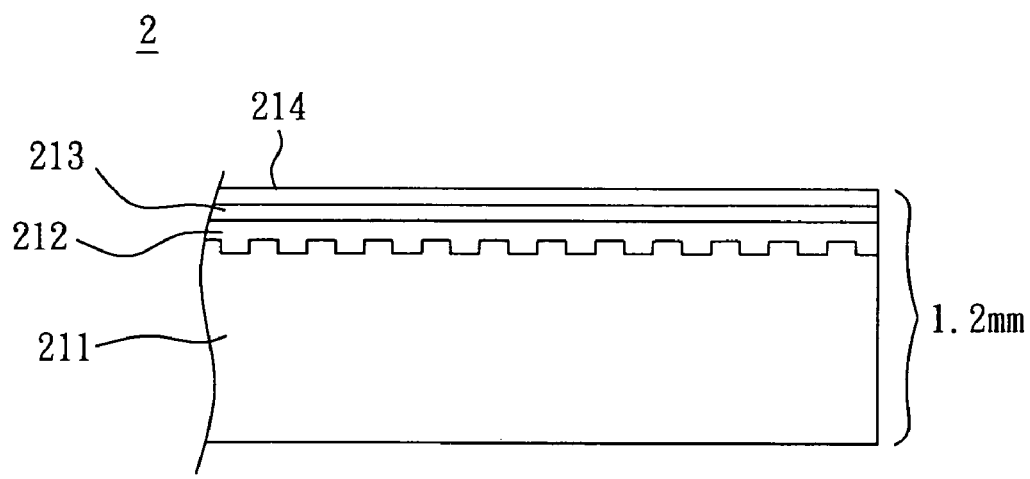
Figure 2:
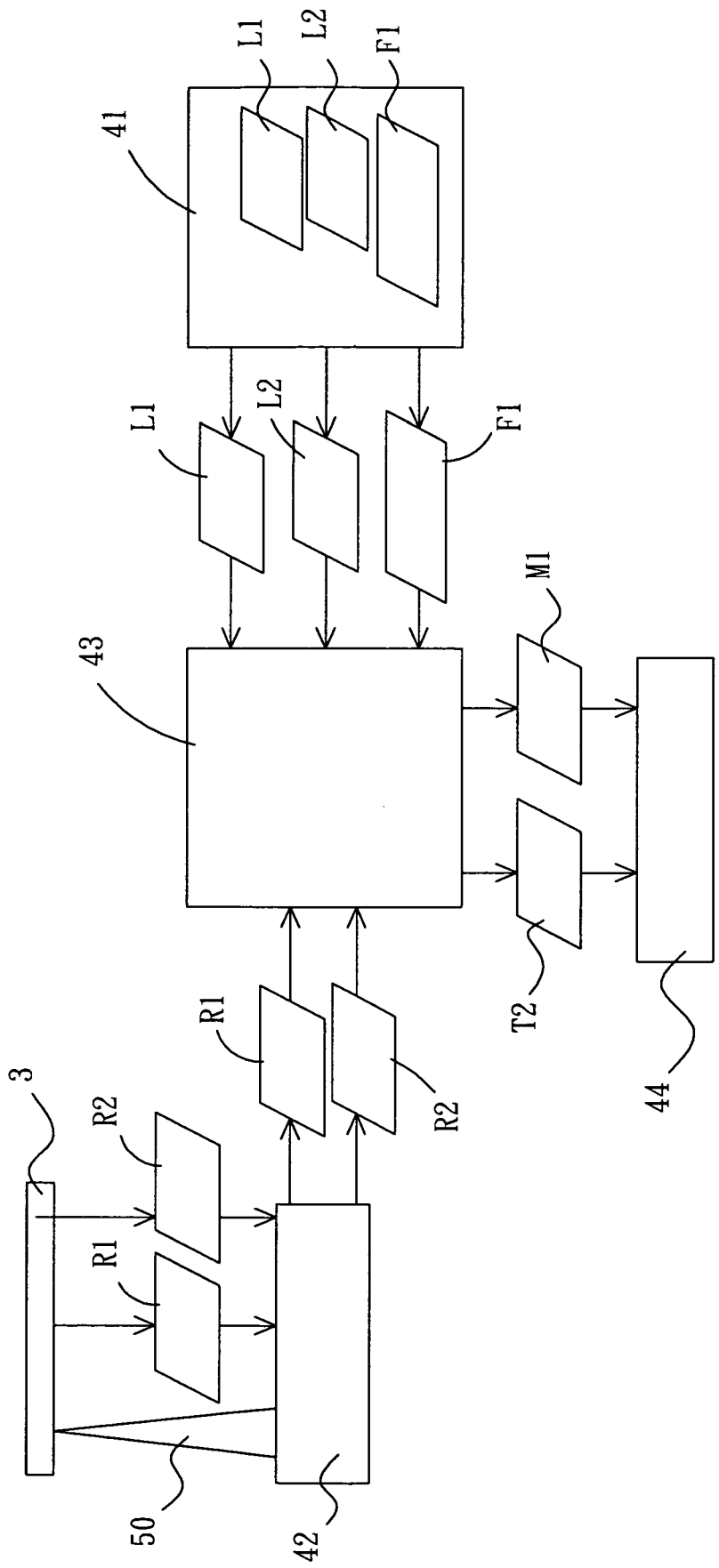
FIG. 2 is a schematic illustration showing an optical disk differentiating electronic device according to a preferred embodiment of the invention.

Please refer to FIG. 2, FIG. 2 is a schematic illustration showing an electronic device according to a preferred embodiment of the invention.

The electronic device according to the preferred embodiment of the invention can read data from an optical disk 3 or write data to the optical disk 3. The electronic device has to distinguish the type of the optical disk 3 such that the data can be read or written. The optical disk 3 may be a compact disk (CD) or a digital versatile disk (DVD). In this embodiment, the optical disk 3 is a CD, and the electronic device may be an optical drive. The electronic device according to the preferred embodiment of the invention includes a memory unit 41, an optical pickup head 42, a signal processing unit 43 and an optical disk differentiating unit 44.

As shown in FIG. 2, the memory unit 41 stores a first level value L1, a second level value L2 and an optical disk differentiating value generating program F1. The first level value L1 and the second level value L2 are respectively reference levels of reflex signals, and may be voltage values, current values, or other values capable of serving as the reference levels. In this embodiment, the memory unit 41 may be a flash memory (Flash ROM), or a memory having memory cells.

The optical pickup head 42 generates a laser beam 50 impinging on the optical disk 3. Further, the optical pickup head 42 receives a first reflex signal R1 reflected by a surface of the optical disk 3 and receives a second reflex signal R2 reflected by a reflex layer of the optical disk 3. In this embodiment, the first reflex signal R1 is generated when a substrate surface of the optical disk 3 partially reflects the laser beam 50, and the second reflex signal R2 is generated when a recording layer of the optical disk 3 reflects the laser beam 50.

Figure 3:
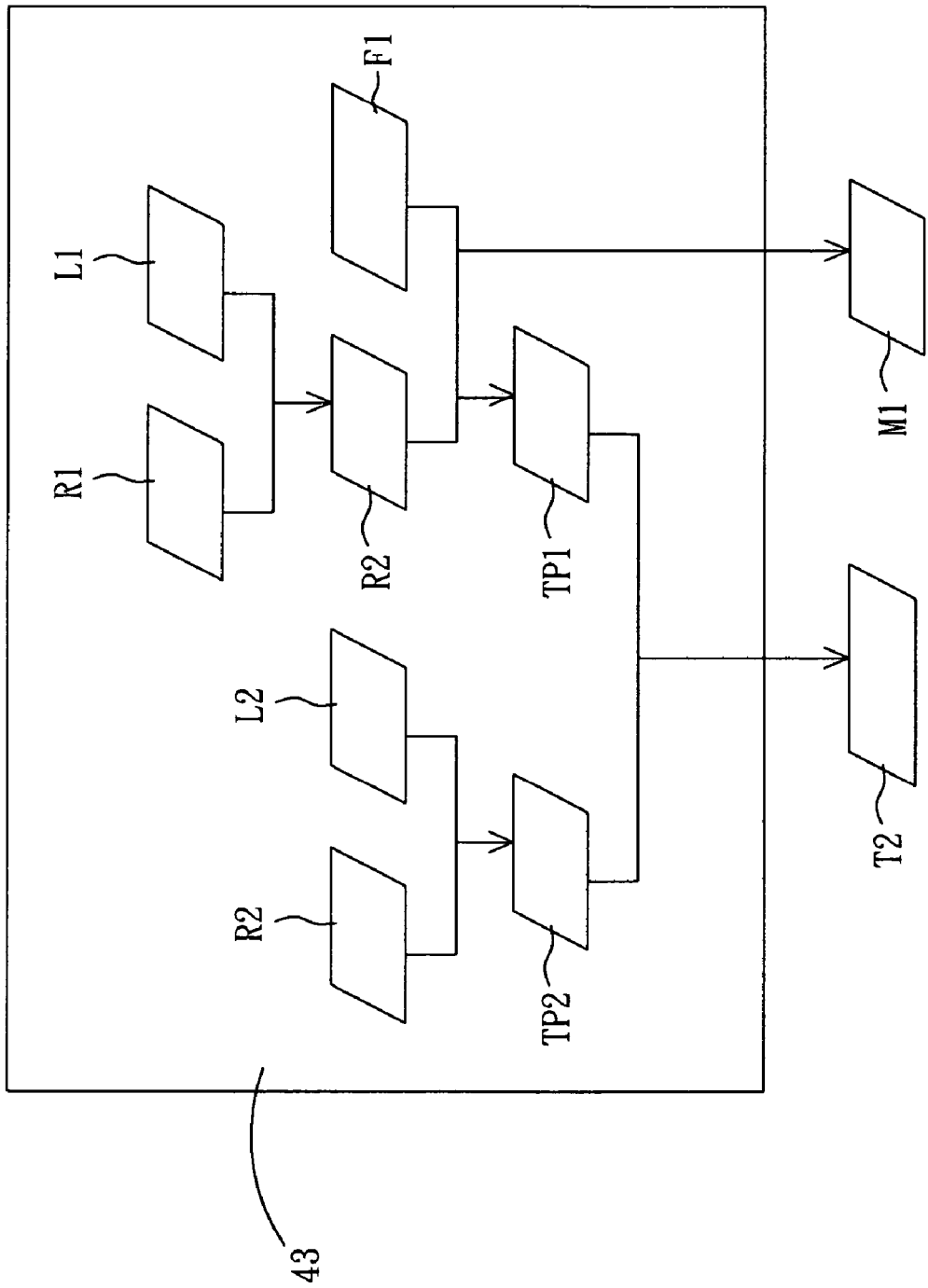
FIG. 3 is a schematic illustration showing a signal processing unit in the optical disk differentiating electronic device according to the preferred embodiment of the invention.
Figure 4A:
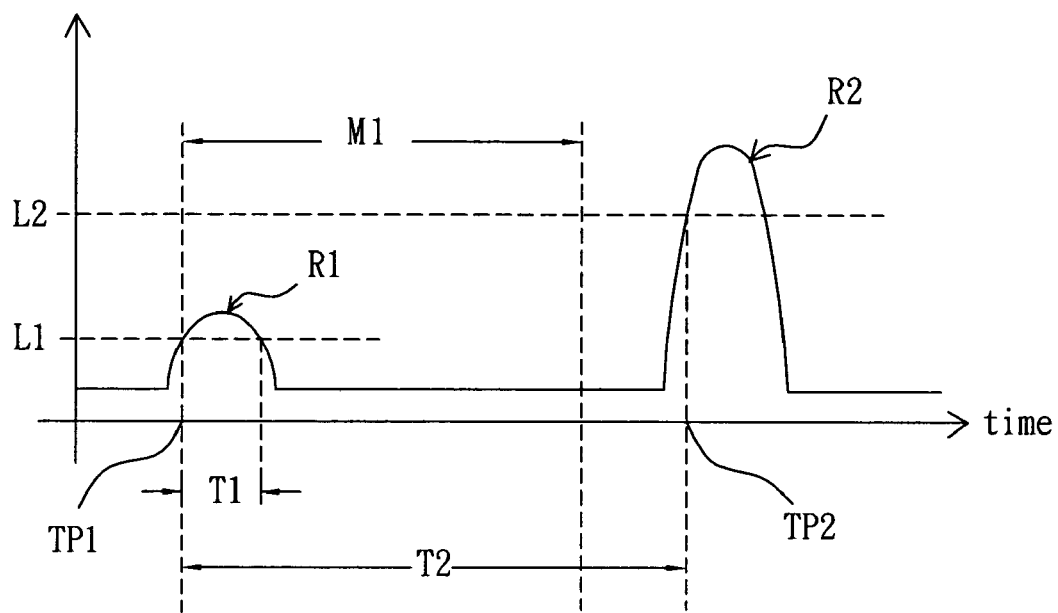

As shown in FIGS. 3 and 4A, the signal processing unit 43 calculates a first time frame value T1 when the first reflex signal R1 is greater than or equal to the first level value L1. The signal processing unit 43 also obtains a first beginning time value TP1 when the first reflex signal R1 firstly equals the first level value. Also, the signal processing unit 43 obtains an optical disk differentiating value M1 according to the first time frame value T1 and the optical disk differentiating value generating program F1 (as shown in FIGS. 2 and 3). In this embodiment, the first time frame value T1 is inversely proportional to the moving speed of the optical pickup head 42, and different first time frame values T1 are generated as the moving speed of the optical pickup head 42 changes. Thus, the moving speed of the optical pickup head 42 may be judged according to this the first time frame value T1.

In this embodiment, the optical disk differentiating value generating program F1 (as shown in FIGS. 2 and 3) may include an equation having a first parameter and a second parameter. The first parameter may be linearly proportional to the second parameter. That is, the second parameter gets larger as the first parameter gets larger. For example, the second parameter=K*the first parameter, wherein K is a constant. In use, the second parameter, which is obtained when the first time frame value T1 serves as the first parameter, serves as the optical disk differentiating value M1. In addition, the optical disk differentiating value generating program may also include a database having a plurality of sets of first parameter values and second parameter values. The optical disk drive finds one of the first parameter values corresponding to the first time frame value T1 so as to obtain one of the second parameter values, which corresponds to the first parameter value, as the optical disk differentiating value M1.

The signal processing unit 43 further calculates a second beginning time value TP2 when the second reflex signal R2 firstly equals the second level value L2. And, the signal processing unit 43 further calculates a difference between the second beginning time value TP2 and the first beginning time value TP1, and also defines the difference as a response time value T2.

Figure 4B:
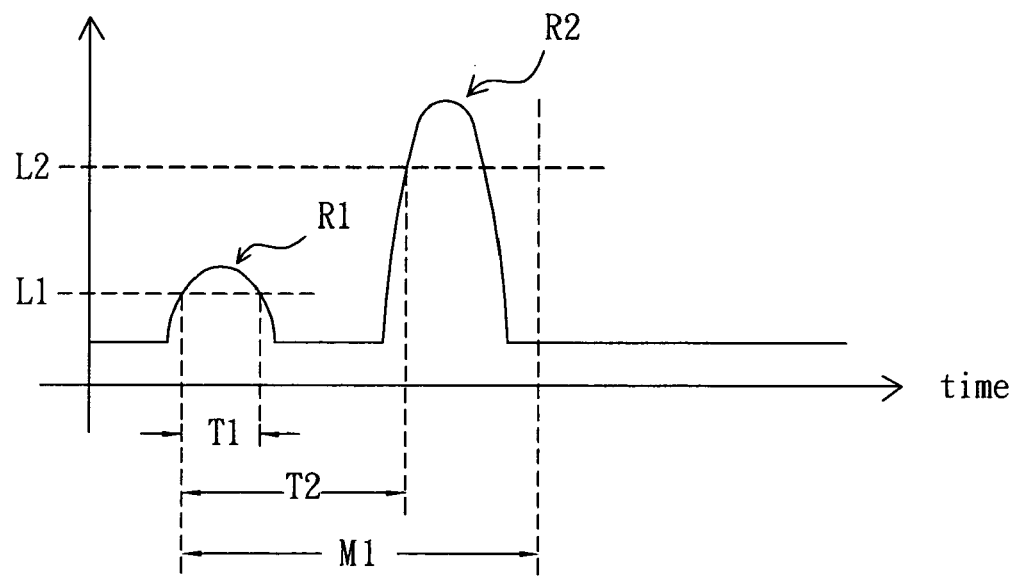

Referring again to FIG. 2, the optical disk differentiating unit 44 judges that the type of the optical disk 3 pertains to the CD or the DVD according to the response time value T2 and the optical disk differentiating value M1. The optical disk 3 can be the CD when the response time value T2 is greater than the optical disk differentiating value M1. The optical disk 3 can be the DVD when the response time value T2 is smaller than the optical disk differentiating value M1. In this embodiment, because the response time value T2 is greater than the optical disk differentiating value M1, the optical disk 3 is the CD. As shown in FIG. 4B, the optical disk 3 is the DVD if the obtained result represents that the response time value T2 is smaller than the optical disk differentiating value M1.

Figure 5:
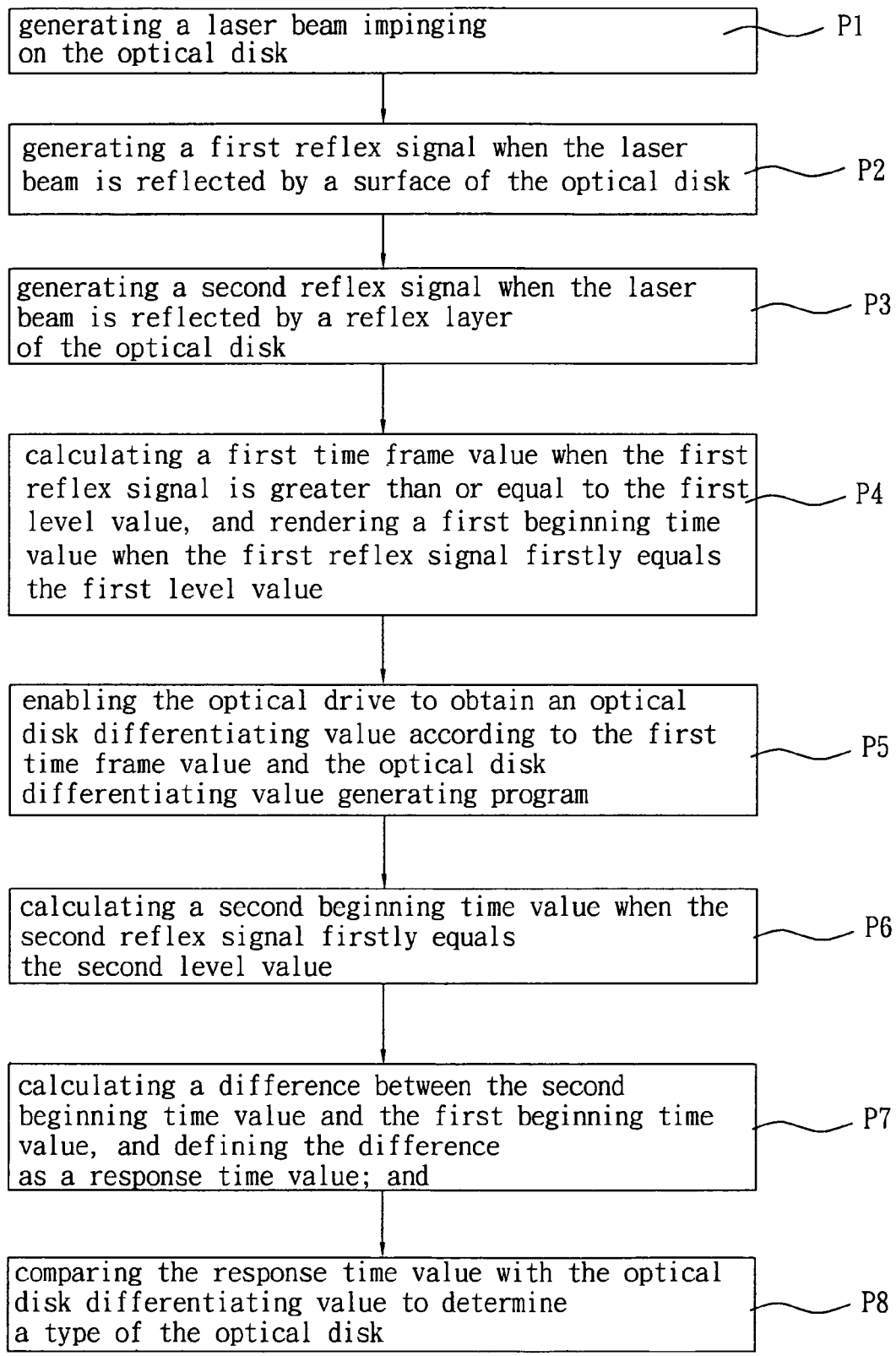
FIG. 5 is a flow chart showing an optical disk differentiating method according to the preferred embodiment of the invention.

As shown in FIGS. 5 and 2, FIG. 5 is a flow chart showing an optical disk differentiating method according to the preferred embodiment of the invention.

The optical disk differentiating method according to the preferred embodiment of the invention is applied to an optical disk drive, in which a first level value L1, a second level value L2, and an optical disk differentiating value generating program are stored and an optical disk 3 is put. In this embodiment, the first level value L1 and the second level value L2 are respectively reference levels of reflex signals, and may be voltage values, current values, or other values capable of serving as the reference levels. The optical disk differentiating method includes the following steps.

First, step P1 generates a laser beam 50 impinging on the optical disk 3. In this embodiment, the laser beam 50 is generated by an optical pickup head 42.

Step P2 generates a first reflex signal R2 when the laser beam 50 is reflected by a surface of the optical disk 3. In this embodiment, the first reflex signal R1 is reflected by the surface of the optical disk 3.

Step P3 generates a second reflex signal R2 when the laser beam 50 is reflected by a reflex layer of the optical disk 3. In this embodiment, the second reflex signal R2 is generated when a recording layer of the optical disk 3 reflects the laser beam 50.

Herein, as shown in FIGS. 3 and 4A, step P4 calculates a first time frame value T1 when the first reflex signal R1 is greater than or equal to the first level value L1, and renders a first beginning time value TP1 when the first reflex signal R1 firstly equals the first level value L1. In this embodiment, the first time frame value T1 is inversely proportional to the moving speed of the optical pickup head 42, and different first time frame values T1 are generated as the moving speed of the optical pickup head 42 changes. Thus, the moving speed of the optical pickup head 42 may be judged according to this property.

In step P5, the optical disk drive obtains an optical disk differentiating value M1 according to the first time frame value T1 and the optical disk differentiating value generating program F1. In this embodiment, the optical disk differentiating value generating program F1 may include an equation having a first parameter and a second parameter. The first parameter may be linearly proportional to the second parameter. That is, the second parameter gets larger as the first parameter gets larger. For example, the second parameter=K*the first parameter, wherein K is a constant. In use, the second parameter, which is obtained when the first time frame value T1 serves as the first parameter, serves as the optical disk differentiating value M1. In addition, the optical disk differentiating value generating program F1 may also include a database having a plurality of sets of first parameter values and second parameter values. The optical disk drive finds one of the first parameter values corresponding to the first time frame value T1 so as to obtain one of the second parameter values, which corresponds to the first parameter value, as the optical disk differentiating value M1.

In step P6, the signal processing unit 43 calculates a second beginning time value TP2 when the second reflex signal R2 firstly equals the second level value L2.

Step P7 calculates a difference between the second beginning time value and the first beginning time value, and defines the difference as a response time value T2.

In step P8, an optical disk differentiating unit 44 compares the response time value T2 with the optical disk differentiating value M1 in order to determine that the optical disk 3 is the CD or the DVD. The optical disk 3 is the CD when the response time value T2 is greater than the optical disk differentiating value M1. The optical disk 3 is the DVD when the response time value T2 is smaller than the optical disk differentiating value M1. In this embodiment, because the response time value T2 is greater than the optical disk differentiating value M1, the optical disk 3 is the CD. As shown in FIG. 4B, the optical disk 3 is the DVD if the obtained result represents that the response time value T2 is smaller than the optical disk differentiating value M1.

As mentioned above, in the optical disk differentiating method and the electronic device thereof according to the invention, the laser beam touches the substrate surface and the recording layer of the optical disk and then the first reflex signal and the second reflex signal are generated. Next, the signal processing unit of the electronic device obtains the first time frame value according to the first level value and the first reflex signal, and then obtains the optical disk differentiating value according to the first time frame value and the optical disk differentiating value generating program. The signal processing unit further obtains the second beginning time value of the second reflex signal according to the second reflex signal and the second level value, and calculates the difference between the first beginning time value and the second beginning time value. Then, the signal processing unit obtains the response time value according to the difference. Finally, the optical disk differentiating unit judges the type of the optical disk according to the optical disk differentiating value and the response time value. Compares with the prior art, which judges the type of the optical disk according to the time difference of the constant reflex signal, the type of the optical disk may be correctly judged regardless of the moving speed of the optical pickup head because the first time frame value and the optical disk differentiating value are dynamically generated according to the moving speed of the optical pickup head.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical disk differentiating method applied to an optical disk drive, in which a first level value, a second level value and an optical disk differentiating value generating program are stored and an optical disk is put, the method comprising the steps of:

generating a laser beam impinging on the optical disk;

generating a first reflex signal when the laser beam is reflected by a surface of the optical disk;

generating a second reflex signal when the laser beam is reflected by a reflex layer of the optical disk; calculating a first time frame value when the first reflex signal is greater than or equal to the first level value, and rendering a first beginning time value when the first reflex signal firstly equals the first level value;

enabling the optical drive to obtain an optical disk differentiating value according to the first time frame value and the optical disk differentiating value generating program;

calculating a second beginning time value when the second reflex signal firstly equals the second level value;

calculating a difference between the second beginning time value and the first beginning time value, and defining the difference as a response time value; and comparing the response time value with the optical disk differentiating value to determine a type of the optical disk.

2. The method according to claim 1, wherein the first level value is a voltage value or a current value.

3. The method according to claim 1, wherein the second level value is a voltage value or a current value.

4. The method according to claim 1, wherein the first reflex signal is generated when the laser beam is partially reflected by a substrate surface of the optical disk.

5. The method according to claim 1, wherein the second reflex signal is generated by a recording layer of the optical disk and the laser beam.

6. The method according to claim 1, wherein the optical disk differentiating value generating program further comprises an equation having a first parameter and a second parameter, and the first time frame value serves as the first parameter such that a value corresponding to the second parameter is obtained to serve as the optical disk differentiating value.

7. The method according to claim 6, wherein the first parameter is linearly proportional to the second parameter.

8. The method according to claim 1, wherein the optical disk differentiating value generating program further comprises a database having a plurality of sets of first parameter values and second parameter values, and the optical disk drive finds one of the first parameter values corresponding to the first time frame value so as to obtain one of the second parameter values as the optical disk differentiating value.

9. The method according to claim 1, wherein the first time frame value is in reverse proportion to a moving speed of an optical pickup head.

10. The method according to claim 1, wherein the optical disk is a CD (Compact Disk) when the response time value is greater than the optical disk differentiating value.

11. The method according to claim 1, wherein the optical disk is a DVD (Digital Versatile Disk) when the response time value is smaller than the optical disk differentiating value.

12. An electronic device for reading data from an optical disk or writing data to the optical disk, the electronic device comprising:
- a memory unit for storing a first level value, a second level value, and an optical disk differentiating value generating program;
- an optical pickup head for generating a laser beam impinging on the optical disk, and receiving a first reflex signal reflected by a surface of the optical disk and a second reflex signal reflected by a reflex layer of the optical disk;
- a signal processing unit for calculating a first time frame value when the first reflex signal is greater than or equal to the first level value, obtaining an optical disk differentiating value according to the first time frame value and the optical disk differentiating value generating program, obtaining a first beginning time value when the first reflex signal firstly equals the first level value, calculating a second beginning time value when the second reflex signal firstly equals the second level value, calculating a difference between the second beginning time value and the first beginning time value, and defining the difference as a response time value; and
- an optical disk differentiating unit for differentiating a type of the optical disk according to the response time value and the optical disk differentiating value.

13. The electronic device according to claim 12, wherein the first level value is a voltage value or a current value.

14. The electronic device according to claim 12, wherein the second level value is a voltage value or a current value.

15. The electronic device according to claim 12, wherein the first reflex signal is generated when the laser beam is partially reflected by a substrate surface of the optical disk.

16. The electronic device according to claim 12, wherein the second reflex signal is generated by a recording layer of the optical disk and the laser beam.

17. The electronic device according to claim 12, wherein the optical disk differentiating value generating program further comprises an equation having a first parameter and a second parameter, and the first time frame value serves as the first parameter such that a value corresponding to the second parameter is obtained to serve as the optical disk differentiating value.

18. The electronic device according to claim 17, wherein the first parameter is linearly proportional to the second parameter.

19. The electronic device according to claim 12, wherein the optical disk differentiating value generating program further comprises a database having a plurality of sets of first parameter values and second parameter values, and the optical disk drive finds one of the first parameter values corresponding to the first time frame value so as to obtain one of the second parameter values as the optical disk differentiating value.

20. The electronic device according to claim 12, wherein the first time frame value is in reverse proportion to a moving speed of the optical pickup head.

21. The electronic device according to claim 12, wherein the optical disk is a CD (Compact Disk) when the response time value is greater than the optical disk differentiating value.

22. The electronic device according to claim 12, wherein the optical disk is a DVD (Digital Versatile Disk) when the response time value is smaller than the optical disk differentiating value.

* * * * *